United States Patent

Leppänen et al.

[11] Patent Number: 5,875,857
[45] Date of Patent: Mar. 2, 1999

[54] ACCUMULATOR CHARGING SYSTEM

[76] Inventors: Jarmo Uolevi Leppänen; Roger Robarts Briggs, both of 11 Junction Road, Industries North, Germiston, South Africa

[21] Appl. No.: 663,280
[22] PCT Filed: Dec. 13, 1994
[86] PCT No.: PCT/GB94/02727
  § 371 Date: Sep. 20, 1996
  § 102(e) Date: Sep. 20, 1996
[87] PCT Pub. No.: WO95/16548
  PCT Pub. Date: Jun. 22, 1995

[30]   Foreign Application Priority Data

Dec. 17, 1993 [ZA] South Africa ............... 93/9446

[51] Int. Cl.$^6$ ..................................................... B25D 9/12
[52] U.S. Cl. ........................... 173/208; 173/17; 173/212; 173/128
[58] Field of Search ................... 173/206, 207, 173/208, 137, 138, 212, 13, 17, 128

[56]       References Cited

U.S. PATENT DOCUMENTS

| | | | |
|---|---|---|---|
| 4,179,983 | 12/1979 | Wallace | 173/208 |
| 4,676,323 | 6/1987 | Henriksson | 173/208 |
| 4,852,663 | 8/1989 | Hunt | 173/208 |
| 5,056,606 | 10/1991 | Barthomeuf | 173/13 |
| 5,392,865 | 2/1995 | Piras | 173/17 |
| 5,479,996 | 1/1996 | Jonsson et al. | 173/212 |

*Primary Examiner*—Scott A. Smith
*Attorney, Agent, or Firm*—Locke Reynolds

[57]       ABSTRACT

A hydraulically operated rock drill including a cylinder, a piston mounted for reciprocating movement in the cylinder, a hydraulic fluid line connected to the cylinder, and an accumulator. A chamber with a section of reduced dimensions is formed in the cylinder, and the piston includes an annular formation which moves within the chamber and into and out of the section as the piston reciprocates. The accumulator is connected via a port to the section, and the hydraulic fluid line is connected to the chamber and is in communication with the accumulator when the annular formation is out of the section and which is cut off from the accumulator, by the annular formation, when the annular formation moves into the section, the annular formation then pressurizing hydraulic fluid in the section whereby hydraulic energy, produced by kinetic energy developed over at least part of a return stroke of the piston, is stored in the accumulator. A second accumulator is connected at least to the high pressure line. A further accumulator and an operating valve opens as the piston moves to a limiting position on its return stroke thereby to store hydraulic energy, derived from the kinetic energy of the piston, in the further accumulator.

4 Claims, 1 Drawing Sheet

ACCUMULATOR CHARGING SYSTEM

BACKGROUND OF THE INVENTION

1. Field Of The Invention

This invention relates to an accumulator charging system for a hydraulically operated rock drill.

2. Description of The Related Art

In a hydraulically operated rock drill kinetic energy of a reciprocating piston is converted to hydraulic energy on a return stroke and stored in one or more hydraulic accumulators by opening an operating valve as the piston moves to a limiting position.

The high pressure hydraulic fluid is passed through the valve behind the piston during the return stroke. The kinetic energy of the returning piston causes the pressure of the fluid to rise behind the piston and in a high pressure oil feed line.

The piston continues on its return stroke until the piston kinetic energy and the hydraulic energy are equalized. The kinetic energy is transformed to hydraulic energy which is stored in the hydraulic accumulator which is thereby charged with a certain volume of pressurized oil.

When the piston has fully retracted its kinetic energy is zero. At this point, on the high pressure hydraulic side, the constant flow of incoming pressurized oil and the charged accumulator contain substantial energy The accumulator has a charging area behind the piston which is the same as the accelerating area. As stated the accumulator is connected to the high pressure oil inlet side.

Problems encountered with the aforementioned arrangement include the following:

(a) generally the ratio between the percussive outlet power and the hydraulic inlet power is fairly low, for example of the order of from 0,55 to 0,65;

(b) all the energy losses inside the rock drill turn to heat, thus raising the temperature of the rock drill and operating oil. The hot oil returning from the drill to a tank must be cooled before being pumped back to the drill. Oil cooling is a major problem, especially in a hot environment. If the temperature of the cooling air or water is close to the acceptable oil temperature, large coolers must be used. The cooling medium heats up the working environment;

(c) large electric motors and hydraulic pumps must be used to supply sufficient operating energy to the rock drill.

(d) The amount of electric power used for operating the rock drill is substantial and expensive.

BRIEF SUMMARY OF THE INVENTION

The invention provides a hydraulically operated rock drill which includes a cylinder, a piston which is mounted for reciprocating movement in the cylinder, a hydraulic fluid line which is connected to the cylinder, and an accumulator, and which is characterized in that a chamber with a section of reduced dimensions is formed in the cylinder, in that the piston includes an annular formation which moves within the chamber and into and out of the section as the piston reciprocates, the accumulator being connected via a port to the section, and in that the hydraulic fluid line is connected to the chamber and is in communication with the accumulator when the annular formation is out of the section and which is cut off from the accumulator, by the annular formation, when the annular formation moves in to the section, the annular formation then pressurizing hydraulic fluid in the section whereby hydraulic energy, produced by kinetic energy developed over at least part of a return stroke of the piston, is stored in the accumulator.

Preferably the hydraulic fluid line is a high pressure line.

In one form of the invention a second accumulator is connected at least to the high pressure line.

The rock drill may include a further accumulator and an operating valve which is adapted to open as the piston moves to a limiting position on its return stroke thereby to store hydraulic energy, derived from the kinetic energy of the piston, in the further accumulator.

The invention is further described by way of example with reference to the accompanying drawing which illustrates from the side and partly sectioned a portion of a hydraulically operated rock drill according to the invention.

DETAILED DESCRIPTION OF THE INVENTION

Figure 1:
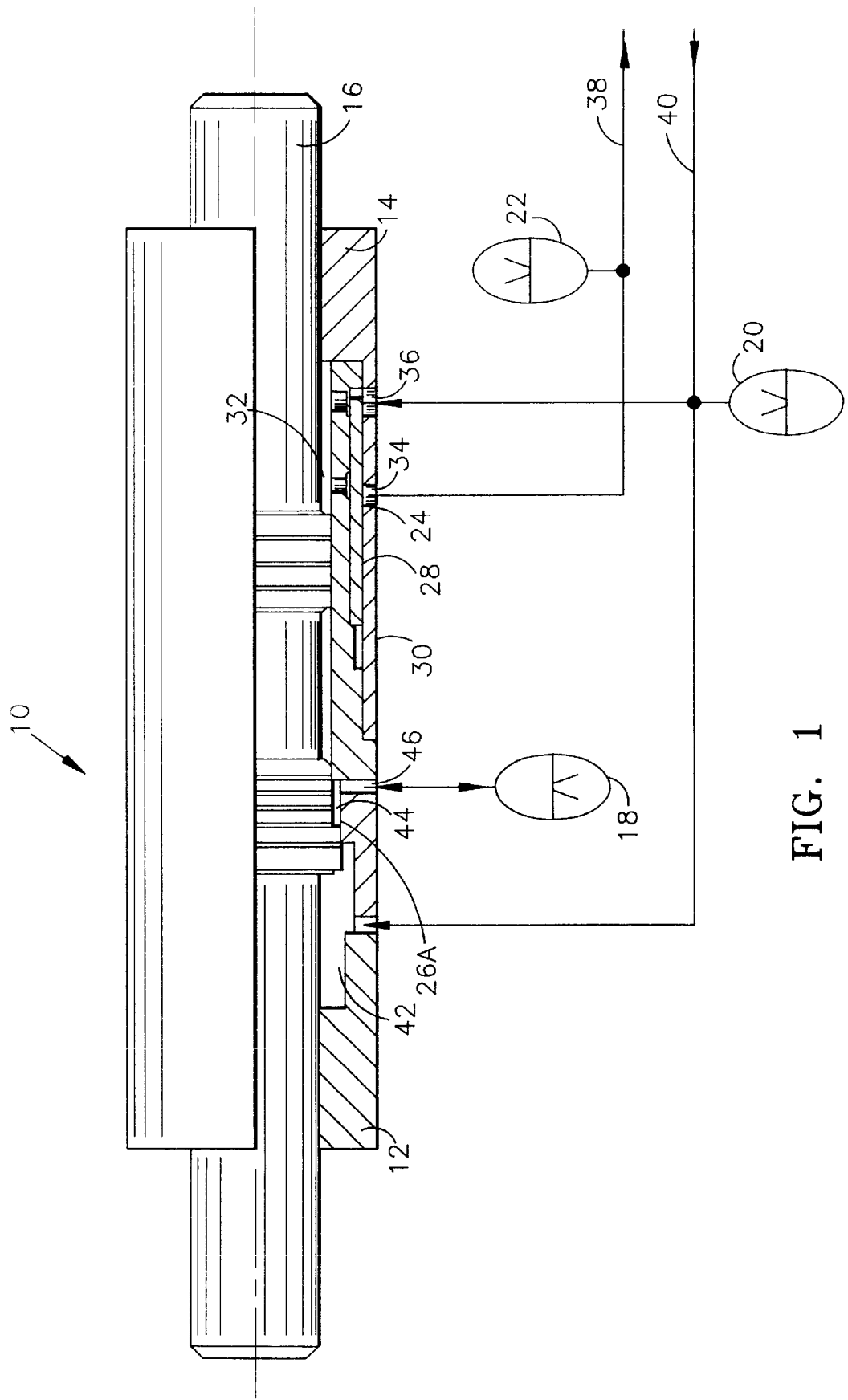
FIG. 1 is a partial cross-section view of a portion of a hydraulically operated rock drill with an accumulator charging system representing the present invention.

The accompanying drawing illustrates a portion of a rock drill 10 according to the invention which includes a front cylinder 12, a rear cylinder 14, a piston 16, and three hydraulic accumulators 18, 20 and 22 respectively. It is to be understood that the cylinder can be formed directly in a body of the rock drill, or by a sleeve mounted in the rock drill body.

The piston includes a first annular portion 24 and a second annular portion 26 which is spaced from the portion 24.

A valve 28 is mounted inside a sleeve 30 for reciprocating movement to control the flow of oil from a right hand side 32 of the portion 24 through ports 34 and 36 respectively. The port 34 is connected to a low pressure oil return line 38 to which the accumulator 22 is also connected. The port 36 on the other hand is connected to a high pressure feed line 40 with the accumulator 20 also being connected to this line.

The front cylinder 12 is formed with a chamber 42 which has a channel section 44 of reduced dimensions at one end. The chamber 42 is connected to the high pressure line 40. The annular portion 26 has a section 26A of increased dimensions which is sized to fit closely, with a sliding action, in the channel section 44. The accumulator 18 is connected via a port 46 to the channel section 44 to the right of the section 26A.

The operation of the rock drill 10 is substantially conventional and for this reason further components of the rock drill have not been shown in the drawing. Similarly conventional aspects relating to the working of the rock drill, not needed for an understanding of the present invention, are not described therein.

The accumulator 20 functions in the manner which has been described in the preamble to this specification in that kinetic energy generated by the piston on its return stroke is converted into hydraulic energy which is stored in the accumulator 20. The accumulator 22, connected to the line 38, functions at a substantially lower pressure, absorbing energy produced by pressure fluctuations in the oil in the return line.

The accumulator 18 is completely separate from the accumulators 20 and 22 and is not directly connected to either of the lines 38 and 40.

Kinetic energy generated on the return stroke of the piston 16 is stored in the accumulator 18 as the piston moves over a certain portion of its return stroke. As the section 26A enters the channel 44, during the return stroke, the hydraulic oil to the right of the section 26A is compressed into the accumulator 18 until the piston kinetic energy is reduced to zero. It is to be borne in mind that during the return stroke the incoming oil charges the conventionally placed accumulator 20 connected to the line 40.

When the operating valve 28 is opened the pressurized oil pressurizes the annular portion 24 behind the piston to start and accelerate the piston stroke.

The recoil accumulator 18 pressurizes the annular section 26A imparting additional acceleration to the piston over the initial stages of the piston stroke. This results in a higher impact velocity for the piston when it strokes its drill shank.

The high acceleration of the piston results from the fact that both annular portions 24 and 26 are, over the initial stages of the piston stroke, subjected to accelerative forces. If the area of the annular portion 24 is increased in order to produce a higher accelerative force then oil consumption is increased. However an equivalent effect can be obtained, as is shown in the drawing and described hereinbefore, by making use of the annular section 26A, without increasing the rock drill oil consumption. This is because the additional accumulator 18 only absorbs the piston recoil energy transforming it from kinetic mode to hydraulic mode and back.

The accumulator 18 is connected to the high pressure line only when the piston is moved in the forward direction so that the section 26A is clear of the channel section 44.

The advantages of making use of the additional accumulator 18 include the following:

increased percussion efficiency;

less heat buildup in the rock drill;

less cooling required in the hydraulic system; and less heat created in the working environment.

We claim:

1. A hydraulically operated rock drill which includes a cylinder (12), a piston (16) which is mounted for reciprocating movement in the cylinder, a hydraulic fluid line (40) which is connected to the cylinder, and an accumulator (18), and which is characterized in that a chamber (42) with a section (44) of reduced dimensions with respect to dimensions of other sections of the chamber (42) is formed in the cylinder (12), in that the piston (16) includes an annular formation (26A) which moves within the chamber and into and out of the section (44) as the piston reciprocates, the accumulator (18) being connected via a port (46) to the section (44), and in that the hydraulic fluid line (40) is connected to the chamber (42) and is in communication with the accumulator (18) when the annular formation (26A) is out of the section (44) and which is cut off from the accumulator (18), by the annular formation (26A), when the annular formation moves into the section, the annular formation then pressurizing hydraulic fluid in the section whereby hydraulic energy, produced by kinetic energy developed over at least part of a return stroke of the piston (16), is stored in the accumulator (18).

2. A rock drill according to claim 1 characterized in that the hydraulic fluid line (40) is a high pressure line.

3. A rock drill according to claim 2 characterized in that a second accumulator (20) is connected at least to the high pressure line.

4. A rock drill according to any one of claims 1 to 3 characterized in that the rock drill includes a further accumulator (22) and an operating valve (28) which opens as the piston (16) moves to a limiting position on its return stroke thereby to store hydraulic energy, derived from the kinetic energy of the piston, in the further accumulator (22).

* * * * *